United States Patent
Hoberman et al.

(10) Patent No.: US 9,628,783 B2
(45) Date of Patent: Apr. 18, 2017

(54) METHOD FOR INTERACTING WITH VIRTUAL ENVIRONMENT USING STEREOSCOPE ATTACHED TO COMPUTING DEVICE AND MODIFYING VIEW OF VIRTUAL ENVIRONMENT BASED ON USER INPUT IN ORDER TO BE DISPLAYED ON PORTION OF DISPLAY

(71) Applicants: Perry Hoberman, Los Angeles, CA (US); Mark T. Bolas, Los Angeles, CA (US); Thai Phan, Redondo Beach, CA (US)

(72) Inventors: Perry Hoberman, Los Angeles, CA (US); Mark T. Bolas, Los Angeles, CA (US); Thai Phan, Redondo Beach, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 256 days.

(21) Appl. No.: 14/216,143

(22) Filed: Mar. 17, 2014

(65) Prior Publication Data
US 2014/0267637 A1    Sep. 18, 2014

Related U.S. Application Data

(60) Provisional application No. 61/801,032, filed on Mar. 15, 2013.

(51) Int. Cl.
*H04N 13/04* (2006.01)
*G06F 1/16* (2006.01)
*G06F 3/01* (2006.01)

(52) U.S. Cl.
CPC ....... *H04N 13/0429* (2013.01); *G06F 1/1626* (2013.01); *G06F 1/1632* (2013.01);
(Continued)

(58) Field of Classification Search
CPC .................................. H04N 13/0429
(Continued)

(56) References Cited

U.S. PATENT DOCUMENTS

| 4,406,532 A | 9/1983 | Howlett |
| 5,508,849 A | 4/1996 | Goodell |

(Continued)

FOREIGN PATENT DOCUMENTS

| EP | 1379082 B1 | 6/2005 |
| WO | WO2004006570 A1 | 1/2004 |

(Continued)

OTHER PUBLICATIONS

Sutherland, I.E. 1965. The Ultimate Display. In Proceedings of IFIP Congress, International Federation for Information Processing, London: Macmillan and Co., 1965, pp. 506-508.
Sutherland, I.E. 1968. A Head-Mounted Three Dimensional Display. In AFIPS '68 (Fall Joint Computer Conference), Dec. 9-11, 1968, New York, NY: ACM, pp. 757-765.
(Continued)

*Primary Examiner* — William C Vaughn, Jr.
*Assistant Examiner* — Joseph A Towe
(74) *Attorney, Agent, or Firm* — McDermott Will & Emery LLP

(57) ABSTRACT

A virtual reality hardware and software platform comprised of a stereoscope which attaches to a mobile touchscreen computer/tablet. The stereoscope, in which the user looks through, covers just the top portion of the tablet screen. This top portion displays the stereoscopic view of a virtual environment. The bottom portion displays the two-dimensional view. The user touches the view with his/her thumbs and/or fingers in order to interact with and travel through the virtual environment seen in the view.

12 Claims, 12 Drawing Sheets

(52) U.S. Cl.
CPC ........... *G06F 3/011* (2013.01); *H04N 13/044* (2013.01); *H04N 13/0456* (2013.01); *H04N 2213/001* (2013.01)

(58) Field of Classification Search
USPC .......................................................... 348/53
See application file for complete search history.

(56) References Cited

U.S. PATENT DOCUMENTS

| | | | |
|---|---|---|---|
| 8,212,859 B2 | 7/2012 | Tang et al. | |
| 8,708,884 B1 | 4/2014 | Smyth | |
| 8,957,835 B2 | 2/2015 | Hoellwarth | |
| 9,293,079 B2 | 3/2016 | Bolas et al. | |
| 2002/0019296 A1 | 2/2002 | Freeman et al. | |
| 2010/0079356 A1* | 4/2010 | Hoellwarth | G02B 27/017 345/8 |
| 2012/0094754 A1* | 4/2012 | Suzuki | A63F 13/10 463/30 |
| 2012/0135803 A1* | 5/2012 | Nonaka | G06F 3/011 463/31 |
| 2013/0113973 A1 | 5/2013 | Miao | |
| 2013/0141360 A1* | 6/2013 | Compton | G06F 1/1632 345/173 |
| 2014/0139551 A1 | 5/2014 | McCulloch et al. | |
| 2014/0268356 A1 | 9/2014 | Bolas et al. | |
| 2015/0355465 A1 | 12/2015 | Jones et al. | |

FOREIGN PATENT DOCUMENTS

| | | |
|---|---|---|
| WO | WO2004006578 A1 | 1/2004 |
| WO | WO2005041568 A1 | 5/2005 |
| WO | WO2005069638 A1 | 7/2005 |
| WO | WO2005069640 A1 | 7/2005 |
| WO | WO2006003600 A1 | 1/2006 |
| WO | WO2006003603 A1 | 1/2006 |
| WO | WO2006003604 A1 | 1/2006 |
| WO | WO2006003624 A1 | 1/2006 |
| WO | WO2012035174 A1 | 3/2012 |

OTHER PUBLICATIONS hasbroMY3D.com. 2010. Product Guide to MY3D App. Hasbro, 3 pages.

USPTO. 2016. Non-Final Office Action dated Aug. 12, 2016 for U.S. Appl. No. 14/216,220, entitled "Dynamic Field of View Throttling as a Means of Improving User Experience in Head Mounted Virtual Environments," filed Mar. 17, 2014, published as U.S. PG Pub 2014/0268356.

Demonstrations by Applicant possibly before Mar. 15, 2012 (see description in document) disclosed for U.S. Appl. No. 14/216,220. 1 page.

Pig Nose Disclosure by Third Party. possibly before Mar. 17, 2014.

LEEP Camera, possibly demonstrated before Mar. 17, 2014. 1 page.

USPTO. 2015. Non-final Office Action dated May 19, 2015 for U.S. Appl. No. 14/216,220, entitled "Dynamic Field of View Throttling as a Means of Improving User Experience in Head Mounted Virtual Environments," filed Mar. 17, 2014, published as U.S. PG Pub 2014/0168356 A1.

USPTO. 2015. Non-final Office Action dated Dec. 4, 2015 for U.S. Appl. No. 14/211,459, entitled "Head-Mounted Display Frame for Improved Spatial Performance in Head Mounted Virtual Environments," filed Mar. 14, 2014, published as U.S. PG Pub 2015/0355465 A1.

USPTO. 2016. Final Office Action dated Feb. 19, 2016 for U.S. Appl. No. 14/216,220, entitled "Dynamic Field of View Throttling as a Means of Improving User Experience in Head Mounted Virtual Environments," filed Mar. 17, 2014, published as U.S. PG Pub 2014/0168356 A1.

USPTO. 2016. Final Office Action dated Jun. 20, 2016 for U.S. Appl. No. 14/211,459, entitled "Head-Mounted Display Frame for Improved Spatial Performance in Head Mounted Virtual Environments," filed Mar. 14, 2014, published as U.S. PG Pub 2015/0355465 A1.

Non-Final Office Action dated Feb. 10, 2017, which issued in U.S. Appl. No. 14/211,459.

Notice of Allowance dated Jan. 5, 2017, which issued in U.S. Appl. No. 14/216,220.

* cited by examiner

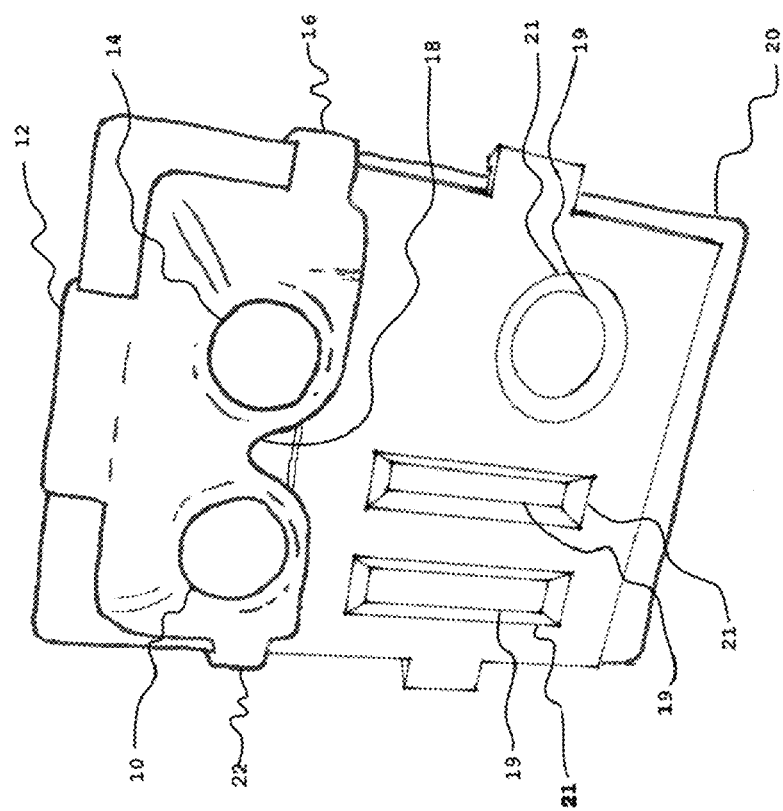
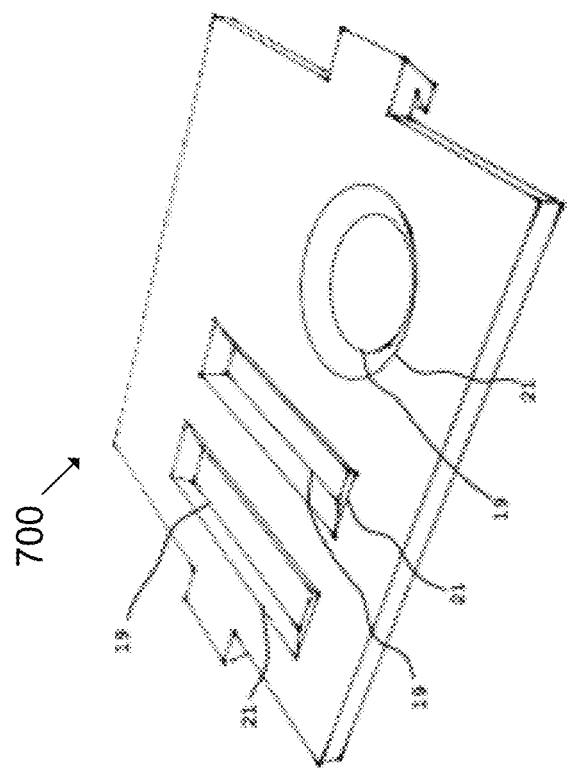
FIG. 7B
FIG. 7A

METHOD FOR INTERACTING WITH VIRTUAL ENVIRONMENT USING STEREOSCOPE ATTACHED TO COMPUTING DEVICE AND MODIFYING VIEW OF VIRTUAL ENVIRONMENT BASED ON USER INPUT IN ORDER TO BE DISPLAYED ON PORTION OF DISPLAY

CROSS-REFERENCE TO RELATED APPLICATION

This application is based upon and claims priority to U.S. provisional patent application 61/801,032, entitled "Inverse Immersive Tablet—Hybrid Stereoscopic Viewing Device," filed Mar. 15, 2013, the entire content of which is incorporated herein by reference.

BACKGROUND

Technical Field

This disclosure to 3D virtual reality (VR) experiences programmed on mobile touchscreen devices such as tablet computers.

Description of Related Art

Stereoscopic 3D displays date back to the 1830s, when Charles Wheatstone built the first stereoscope, later improved by David Brewster and Oliver Wendell Holmes. The Holmes stereoscope was extremely popular in the second half of the 19th century, and could be said to be the virtual reality (VR) of its day. In 1939, the View-Master was introduced, and became the most widely used stereoscope for most of the 20th century. The first stereoscopic head-mounted display (HMD) was built by Ivan Sutherland in 1965, but it wasn't until the 1980s that any handheld stereo VR display appeared. The BOOM™ by FakeSpace in 1991, U.S. Pat. No. 5,253,832, the entire content of which is incorporated herein by reference, was an early example of handheld (or head-coupled) VR displays.

Virtual Keyboards: Virtual keyboards, such as the on-screen keyboard on smartphones, have something in common with the idea we are describing, in that the lower part of the screen is used as input for the upper part of the screen.

Hasbro™ my3D™ (stereoscopic smartphone attachment): The my3D™ has thumb holes at the bottom which allow limited and fairly awkward interaction by tapping the touchscreen display.

The devices above used to consume stereoscopic VR experiences exhibit certain limitations:

(a) HMDs require a separate computer for rendering and displaying graphics.

(b) HMDs require separate means for tracking the user's head position and orientation, through the use of external mechanical, magnetic, or optical sensors.

(c) HMDs require external sources of input (such as keyboards, mice, and joysticks) in-order to control and interact with the immersive VR software.

(d) An HMD's limited field-of-view is a combination of optical magnification power and the distance between the user's eyes and the lenses.

(e) HMDs force users to attend exclusively to tasks in the VR environment, and inhibits the user from performing other real-world tasks.

(f) With HMDs, the user is immersed in a display that entirely fills his/her visual field, blocking out their actual physical surroundings and isolating them from the real world.

(g) HMDs attach to the user's head by means of a head band, which is difficult to customize for every head shape and hairstyle.

(h) Smartphones have the computational power to render and display sophisticated computer-generated graphics, but have limited screen space to do so.

(i) Smartphones with touchscreens can receive user input via finger touch, but fingers can obscure the user's view of the screen if attached is a stereoscope that envelopes the entire screen of the smartphone.

(j) Smartphones with attached stereoscopes are capable of receiving user input that does not interfere with the user's view of the screen, but only if an external source of input is used (such as a wireless keyboard).

(k) Stereoscopes for smartphones such as the Hasbro™ my3D™ envelop the entire smartphone, isolating the other useful features of the smartphone from the user.

(l) External sources of input occupy coordinate systems that are different from the coordinate systems of the display (the direction of "UP" on a joystick is different from what is "UP" inside an HMD or smartphone, which is disorienting for the user).

(m) All stereoscopes, whether they are HMDs or stereoscopes for smartphones, force the user's eyes to focus on the visual experience, which forces the user to rely on the sense of touch to find external controllers.

SUMMARY

This hybrid stereoscopic viewing device is a fully-contained and functionally complete virtual reality (VR) platform, which comprises of a detachable stereoscope and a mobile touchscreen tablet. No external controllers or peripherals are necessary since the VR software programmed onto the tablet gathers input directly from the user through the touchscreen itself. The software gathers further input via the tablet's available sensors (i.e. gyrometers, accelerometers, magnetometers, depth cameras, video cameras), obviating the need for external motion tracking systems which are commonly used in VR applications.

Accordingly, the present inventive concepts may include:

(a) to allow the user to view a computer-generated virtual reality (VR) environment and control his/her point-of-view within this virtual environment (VE) all on the same tablet;

(b) to unobstruct the user's stereoscopic view when he/she is touching the touchscreen interface of the tablet;

(c) to allow the user's eyes to be as close to the stereoscope's lenses in order for them to perceive the maximum field-of-view;

(d) to allow a broader audience to experience and interact with virtual environments;

(e) to leverage the tablet's built-in sensors (including gyrometers, accelerometers, magnetometers, depth cameras, video cameras) in order to track the user's position and rotation in the real world;

(f) to allow the user unencumbered access to all of the built-in functions of the tablet while he/she is using the stereoscope with tablet;

(g) to allow the user to transition fluidly between tasks in the VE and tasks normally performed on a touchscreen tablet by-itself;

(h) to allow the user to quickly switch between tasks in the VE and tasks in the real world;

(i) to allow the user to easily communicate his/her experience about the VE to other users in the same room;

(j) to give the user an intuitive mapping of controls in the VE; and (k) to allow the user to control their virtual experience without requiring them to look away from the stereoscope and the virtual experience it presents.

One implementation describes a method of interacting with a virtual environment using a stereoscope removably attached to a computing device having a display integrated with an input device, the display having a first portion and a second portion, the stereoscope covering the first portion and positioned to allow stereoscopic viewing of a view of the virtual environment The method comprises displaying, on the first portion, the view of the virtual environment, and displaying, on the second portion, a user interface element. The method further comprises receiving, from the input device, a user input based on the user interface element; modifying, based on the user input, the view of the virtual environment; and displaying, on the first portion, a modified view of the virtual environment.

Another implementation describes a method of interacting with a virtual environment using a stereoscope removably attached to a computing device having a display integrated with an input device, the display having a first portion and a second portion, the stereoscope covering the first portion and positioned to allow stereoscopic viewing of a view of the virtual environment. The method comprises moving the stereoscope near a user's eyes such that the second portion is not visible to the user. The method further comprises viewing, through the stereoscope, a view of the virtual environment on the first portion; moving the stereoscope away from the user's eyes such that second portion is visible to the user; interfacing with the second portion to manipulate the view of the virtual environment when the second portion is visible to the user; and viewing, through the stereoscope, a manipulated view of the virtual environment when the stereoscope is near the user's eyes.

In yet another implementation, a non-transitory, tangible, computer-readable storage medium contains a program of instructions that cause a computer system running the program of instructions to detect whether a stereoscope is attached to a first portion of a display of the computer system; display, on the first portion, a stereoscopic view of a virtual environment when the stereoscope is attached to the display; display, on a second portion of the display, a user interface element; receive, from an input device of the computer system, a user input based on the user interface element; modify, based on the user input, the stereoscopic view of the virtual environment; and display, on the first portion, the modified view of the virtual environment.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 7A illustrates a plastic stencil with beveled-cutouts according to example aspects of the present disclosure.

FIG. 7B illustrates the plastic stencil of FIG. 7A attached to the tablet according to example aspects of the present disclosure.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
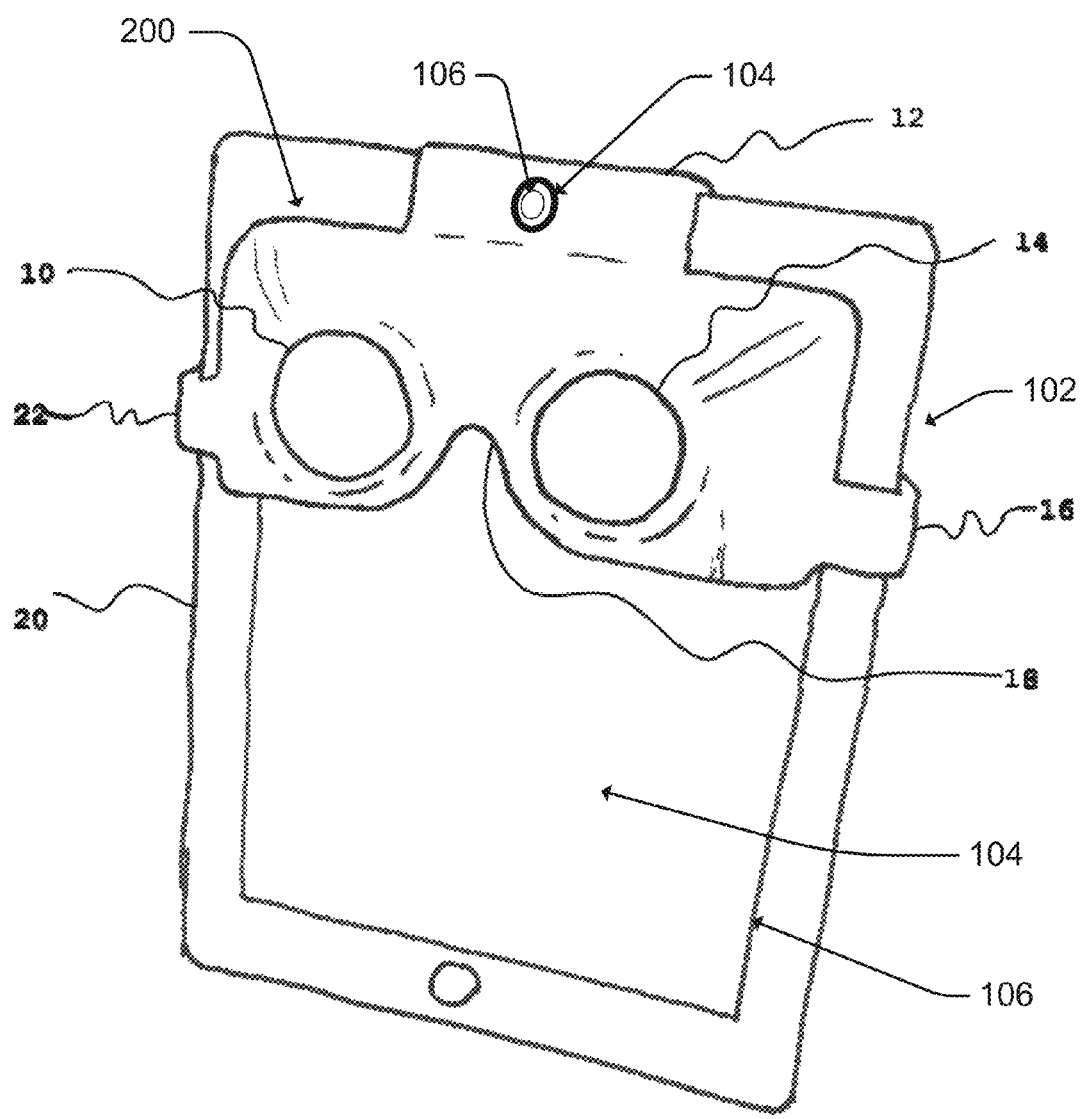
FIG. 1 illustrates the stereoscope attached to the mobile touchscreen tablet designed for a tablet held in portrait orientation according to example aspects of the present disclosure.
Figure 2B:
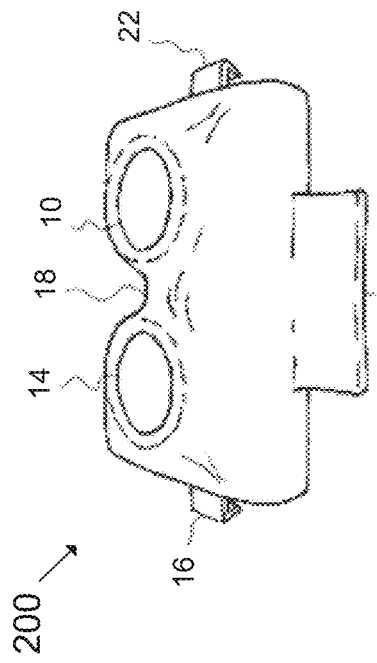
FIG. 2B illustrates the top of the unattached stereoscope according to example aspects of the present disclosure.
Figure 2C:
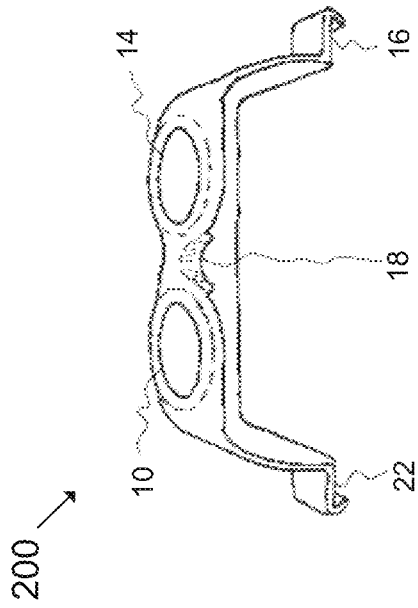
FIG. 2C illustrates the bottom of the unattached stereoscope according to example aspects of the present disclosure.
Figure 2A:
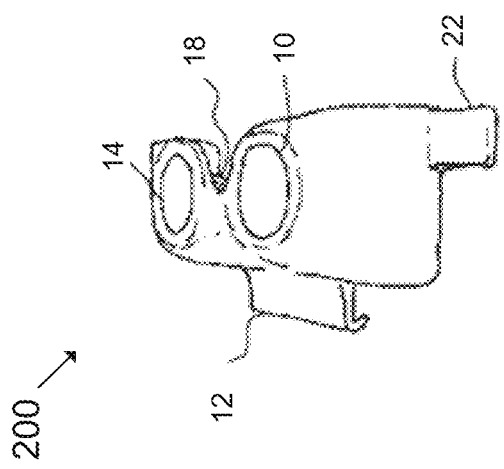
FIG. 2A illustrates the left-side of the unattached stereoscope according to example aspects of the present disclosure.
Figure 3:
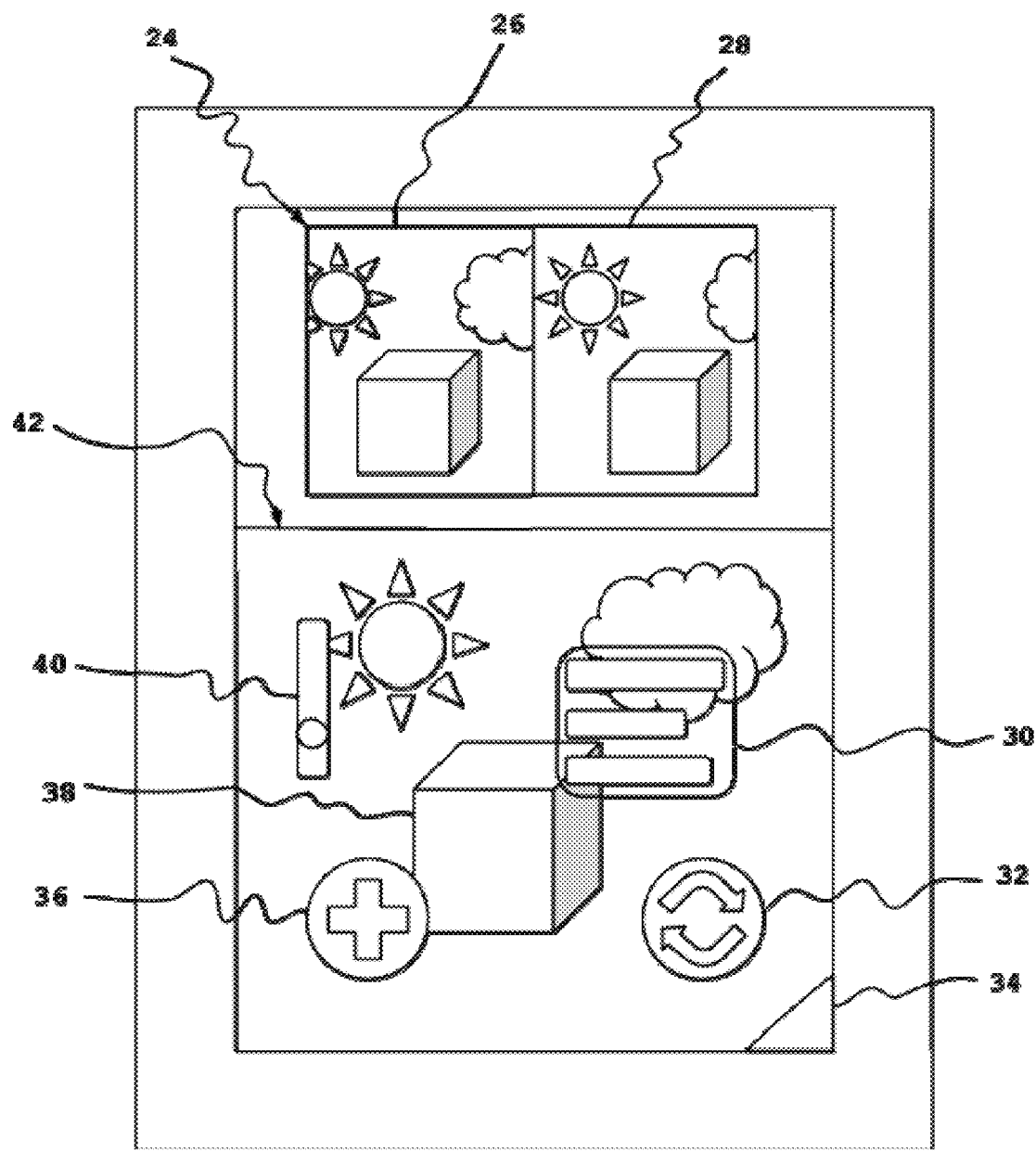
FIG. 3 illustrates the graphical user interface (GUI) of the tablet according to example aspects of the present disclosure.

One implementation of a hybrid stereoscopic display is illustrated in FIG. 1. It comprises a detachable stereoscope 200, as illustrated in FIG. 2A, FIG. 2B, and FIG. 2C, as well as a mobile touchscreen tablet 20 which is programmed with the virtual reality (VR) software and graphical user interface (GUI). The stereoscope affixes itself to the front of the tablet with a clip 16 on the right side and a clip 22 on the left side. The top clip 12 keeps the stereoscope centered on top of the stereoscopic view 24 (FIG. 3). Mounting means besides a clip can also be used such as hook and loop fasteners, threaded fasteners, adhesives, and so forth. The stereoscope 12 may include an opening 104 for exposing, for example, a camera 106 of the tablet 20, or other feature of the tablet 20. The stereoscope contains a pair of lenses, a right lens 14 and a left lens 10. The lenses are typically 34 mm to 61 mm in diameter and are spaced anywhere between 61 mm to 68 mm apart. Their magnification power can be anywhere from 4× to 7×. These lenses can be spherical, aspherical, reflective, fresnel-based, or other magnifying optical approaches including combinations of the above. Lenses made from plastic may be used to reduce weight. The stereoscope itself can be made of a sturdy plastic such as acrylonitrile butadiene styrene (ABS). Thickness of the material may be anywhere between 2 mm to 5 mm, although other thicknesses may be used. The stereoscope may cover from approximately 25%-75% of the display, such as about 50%, or may cover more or less of the screen, although less than 100% to provide screen space for a GUI. The GUI screen may be arranged as a single continuous portion as described, or may be arranged as multiple portions that straddle or surround the stereoscope.

Figure 4A:
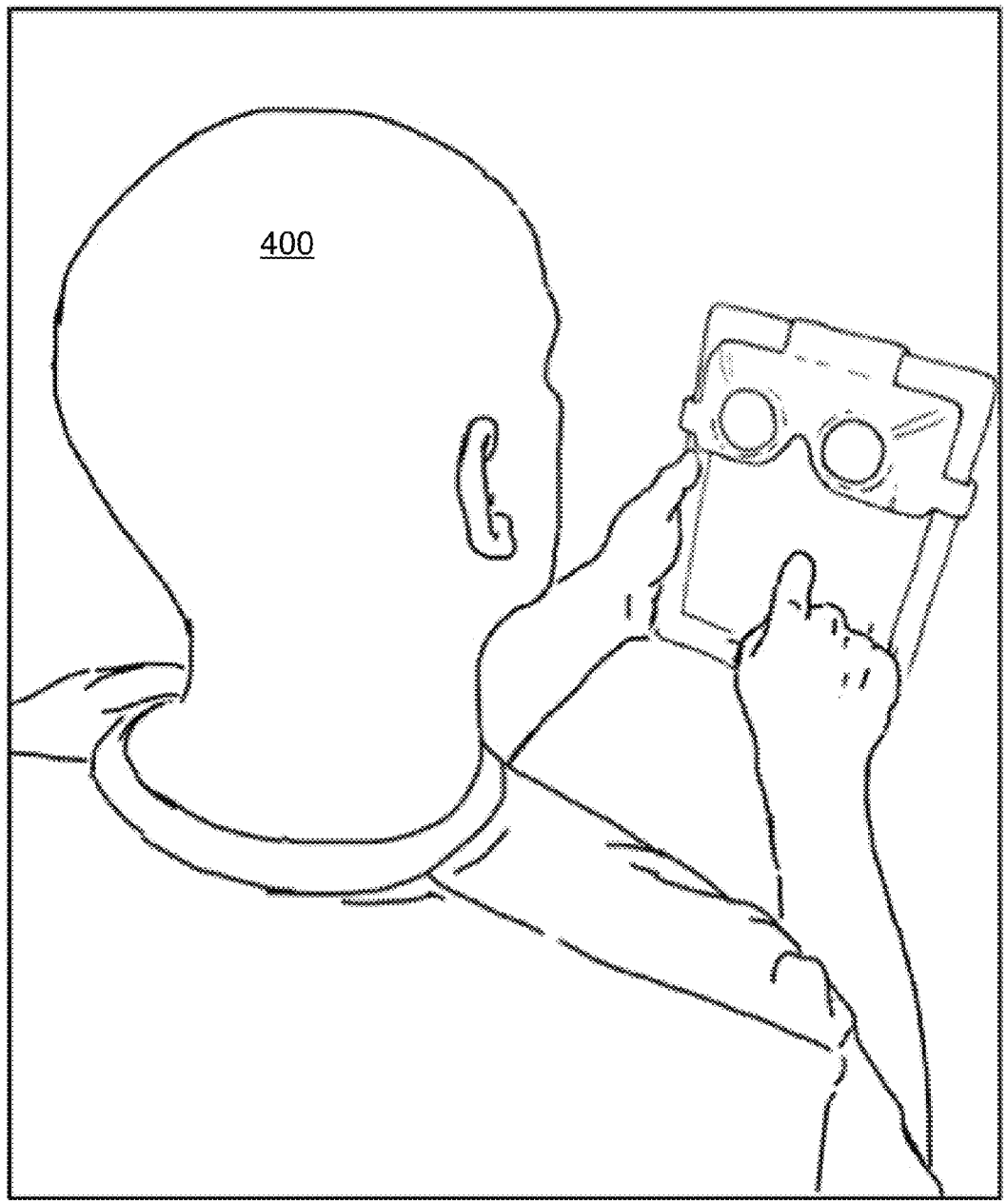
FIG. 4A illustrates a user interacting with the tablet when not looking through the stereoscope according to example aspects of the present disclosure.
Figure 4B:
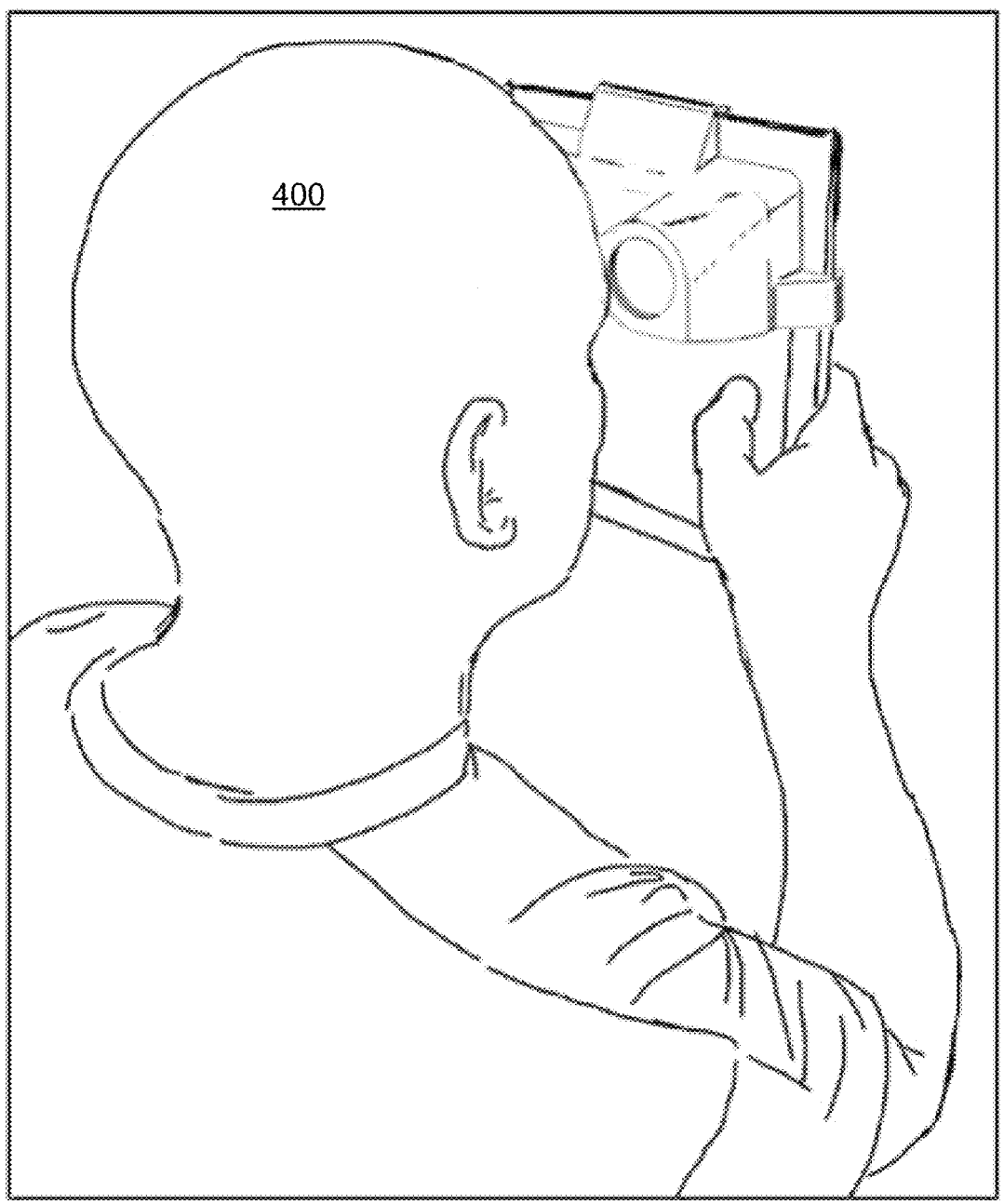
FIG. 4B illustrates the user interacting with the tablet when looking through the stereoscope according to example aspects of the present disclosure.

In one implementation, a user 400 holds the display up to his/her face, as shown in FIG. 4B, and looks through the lenses 14 and 10 to see the stereoscopic view 24 of a virtual environment (VE). The saddle bridge 18 allows the user's nose to fit underneath the stereoscope. With the corners of the tablet 20 resting firmly in his/her hands, he/she can interact with the lower portion of the touchscreen using his/her thumbs. FIG. 4A shows that the user may also pull the display away from his/her face in order to interact with the touchscreen using one or more fingers or to view the two-dimensional (2D) view 42 (FIG. 3) of the VE. Other hand postures may be used as well.

FIG. 3 also illustrates one implementation of a GUI programmed for the tablet 20. The user's fingers and/or thumbs may interact with any number of one-dimensional controls such as slider(s) 40 or radial dial(s) 32; two-dimensional controls such as joystick zone(s) 36; or button(s) 34 or pop-up menus 30 or with a view of the virtual environment 42 including but not limited to having the user "touch" object(s) 38 inside the VE.

Figure 5A:
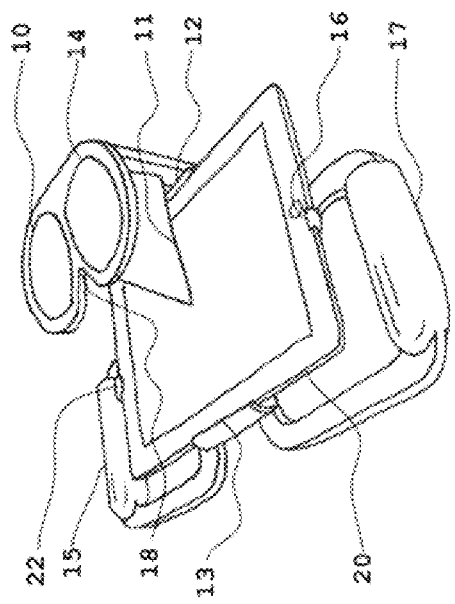
FIG. 5A illustrates a stereoscope designed for a tablet held in a landscape orientation according to example aspects of the present disclosure.
Figure 5B:
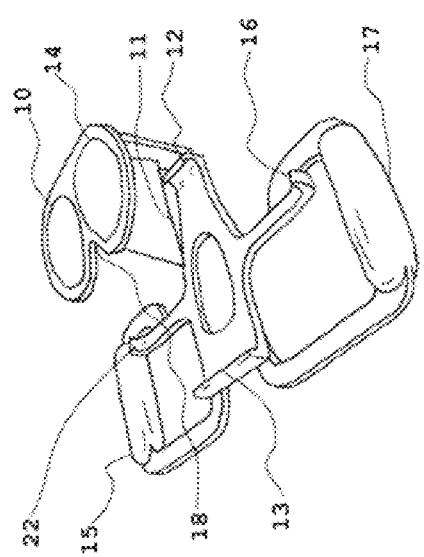
FIG. 5B illustrates the stereoscope of FIG. 5A attached to a tablet according to example aspects of the present disclosure.
Figure 5C:
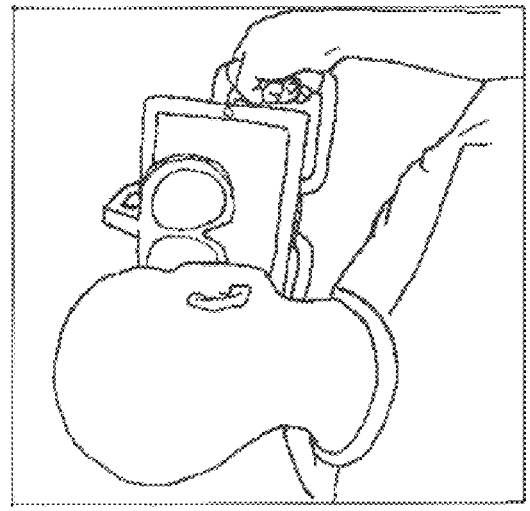
FIG. 5C illustrates a user holding the stereoscope and tablet of FIG. 5B according to example aspects of the present disclosure.

Another implementation is shown in FIGS. 5A, 5B, and 5C. FIG. 5A shows the stereoscope unattached from the tablet. In addition to clips 12, 16, and 22, a bottom clip 13 is used to secure the tablet in place. FIG. 5B shows the tablet 20 attached to the stereoscope. FIG. 5C shows the user holding the stereoscope (rather than the tablet) by gripping the left handle 15 and the right handle 17. The lens 10 and 14 will be of a larger diameter and lesser magnification power (ie 60 mm and 4× respectively). An image divider 11 is used to prevent the user's left eye from seeing the right eye view and to prevent his/her right eye from seeing the left eye view.

Figure 6B:
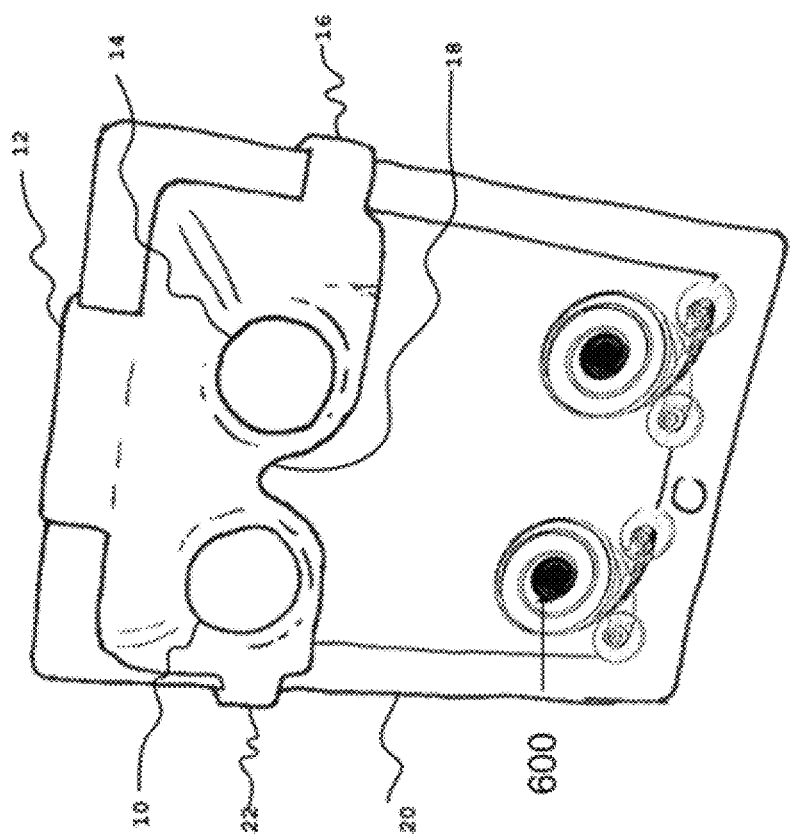
FIG. 6B illustrates the metal knob of FIG. 6A attached to the touchscreen by suction cups according to example aspects of the present disclosure.
Figure 6A:
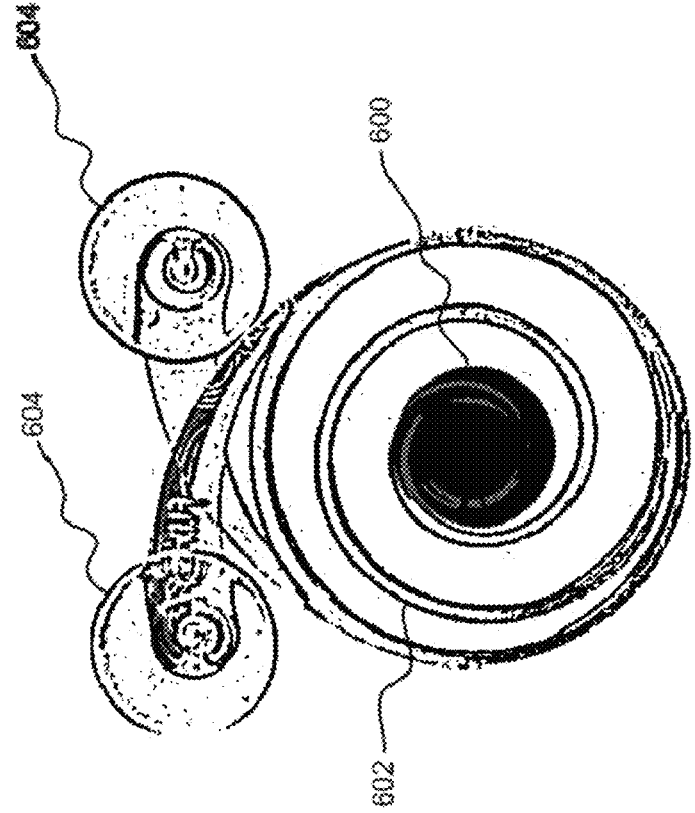
FIG. 6A illustrates a metal knob connected to clock springs and suction cups according to example aspects of the present disclosure.

FIGS. 6A and 7A are attachments that can be added the tablet in order to aid the user in finding touchscreen controls using just touch, specifically when the user's eyes are focused on the stereoscopic view. FIG. 6A shows a knob 600 which is recognized by the tablet as a finger touch. The knob 600 may be metal or other hard material. The knob is connected to one or more plastic clock springs 602, which in turn are attached to the touchscreen with suction cups 604. As the metal knob is pushed with the thumb or finger in one direction, the plastic clock springs push the knob in the opposing direction. Logitech® and Ten One Design LLC have designed such attachments for tablets like the Apple® iPad® (tablet computer). FIG. 6B shows how they would attach over the touchscreen.

FIG. 7A shows a stencil which is a plastic sheet 700 with cutouts 19 and beveled edges 21, also designed to assist the user in interacting with the touchscreen without requiring the user to look directly at the graphical user interface. The plastic sheet 700 may be made of hard plastic or other suitable hard material. It can be attached to the tablet separate from the stereoscope, as shown in FIG. 7B, or the stereoscope and stencil can be one whole attachment. Beveled edges 21 provide tactile feedback to fingers that make direct contact with the touchscreen. Non beveled edges or other edge treatments may also be used.

Several features may be exhibited from example aspects of the present disclosure:

(a) Virtual reality (VR) software can be written for an abstracted set of tablet hardware since the software developer does not need to consider programming for the myriad of external controllers that is required for interactions within traditional VR environments.

(b) The stereoscope divides the touchscreen into two separate spaces, keeping the user's finger interactions from interfering with his/her stereoscopic view.

(c) The stereoscope's saddle bridge accommodates for a great variety of users' nose shapes, allowing each user to bring his/her eyes closer to the lenses, which grants them the maximum field-of-view.

(d) Users with any size and shape of head, along with any hairstyle, will be able to hold the hybrid display close to their faces, because the device is hand-held it enables users to freely position the device with respect to their face thus accommodating a wide range of user ergonomic preferences and body and facial features including skull geometry.

(e) The software does not need to interface with external tracking systems, since the software developer can access all tracking data directly from the tablet's built-in sensors.

(f) The stereoscope is easily and readily detachable, allowing the user to pause his/her VR experience and switch to a different task on the tablet, e.g. browsing the Internet, checking E-mail.

(g) The software can incorporate seamless transitions between immersive experiences and traditional touchscreen experiences (an example of this would be an e-reader style storybook which includes stereoscopic illustrations).

(h) Due to the portability of the hybrid display, the user can enjoy VR experiences in any real world setting (indoors and outdoors).

(i) If the user needs to attend to a task in the real world, he/she simply puts down the hybrid display and pull away from the VR experience.

(j) The user can use the 2D view 42 to verbally communicate and share his/her current VR experience with other users nearby.

(k) Touchscreen controls on 42 share the same coordinate system as the view 24 on the tablet since they are all on the same device (the direction of "UP" on the touchscreen is the same as "UP" inside the view).

(l) Users are able to keep their sights trained on the immersive experience as they are able to control their experience by touching tablet attachments that provide tactile feedback.

Software Initialization

Figure 9:
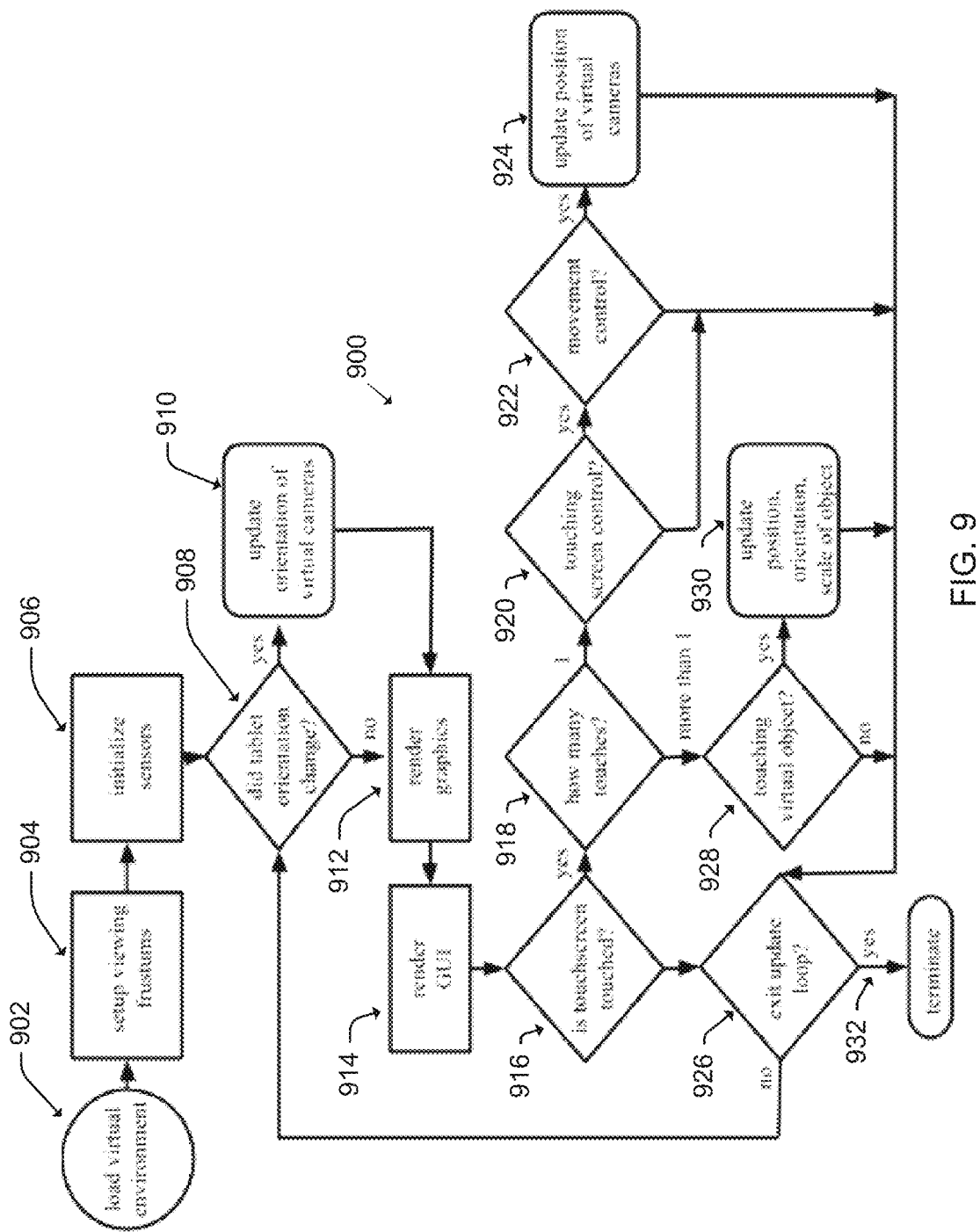
FIG. 9 illustrates a flowchart of software operations according to example aspects of the present disclosure.

The hybrid display exists when the stereoscope is attached to a tablet which has been programmed with the virtual reality (VR) software. The user starts the VR software as they would any other software application on the tablet. FIG. 9 shows a flowchart 900 of one implementation.

The software starts by loading a virtual environment (902) and by setting up the position and orientation of virtual cameras in a virtual environment (VE) mapped to a three-dimensional cartesian coordinate system (904). At a minimum is one pair of stereo virtual cameras, consisting of one camera to render an image for the left-eye view 26 and another camera to render an image for the right-eye view 28. Computer generated images are generated in real-time, and are updated in the software's update loop (which can refresh at a rate of 30 frames per second, or higher, to minimize the chances of motion sickness for the user). A standard 3D graphics rendering pipeline can be implemented to create the 2D raster representations (for views 26, 28, and optionally 42) of the 3D VE. Each view 26 and 28 measures 42% of the display's width and 31.25% of the display's height.

Figure 8B:
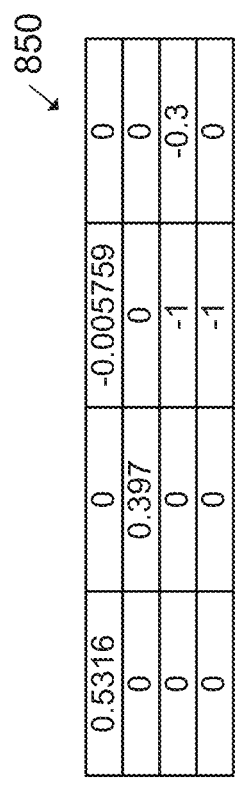
FIG. 8B is a 4×4 perspective projection matrix for another viewing frustum according to example aspects of the present disclosure.
Figure 8A:
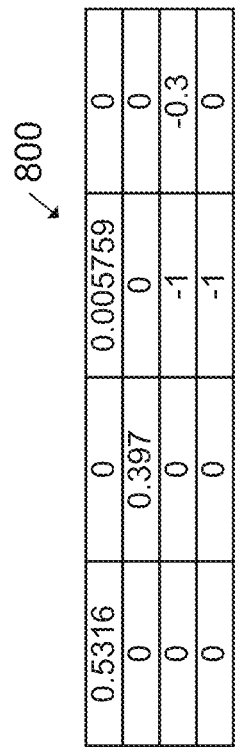
FIG. 8A is a 4×4 perspective projection matrix for a viewing frustum according to example aspects of the present disclosure.

The view dimensions defined above were designed to be magnified by 7× magnifying lenses. The 4×4 perspective projection matrix 800 shown in FIG. 8A is used to setup the off-axis viewing frustum for the left virtual camera. The matrix 850 shown in FIG. 8B is used to setup the frustum for the right virtual camera. However, the components of each matrix are arbitrary and depend largely on the dimensions of view 26 and 28, and how each lens 10 and 14 is centered over each corresponding view. The values for the near and far clipping planes of each camera are also arbitrary, but the near clipping plane is usually set to 0.15 units and the far clipping plane is set to 1000 units. VEs typically adopt meters for measuring distance. Finally, the software also prepares to receive data from the tablet's built-in sensors.

Software Update Loop—Sensors

After the software has completed the initialization process, it initializes sensors (906) and it enters its update loop (908), executing rendering code and control code 30 times per second or more. This is where the position and orientation of the virtual cameras are updated (910, 924), based on user input from the graphical user interface and the tablet's built-in sensors.

Orientation data received from the tablet's gyrometer and magnetometer can be mapped directly to the orientation of the virtual cameras. The software can also be programmed to use the tablet's video camera to recognize fiducial markers using computer vision algorithms. Based on the position or orientation of the marker perceived by the video camera, the virtual cameras can be positioned and oriented accordingly. Position data for the virtual cameras can also be obtained from the tablet's depth sensors. For example, the virtual cameras can be repositioned in virtual space based on how far the user holding the tablet is standing from a solid wall indoors. Global position data received from a built-in GPS sensor, represented as latitude and longitude pairs, can also be used to reposition virtual cameras or instruct the tablet to switch between different VEs. Other sensors may also be used including but not limited to position, orientation, keyboards, switches, sliders, touch devices, acoustic, eye tracking, user tracking relative to the lenses and display and so forth. Such sensors may not be part of the tablet's available sensors and be incorporated into the system via Bluetooth, USB, or other such data communication mechanisms.

There are many other ways sensor data can update the position and orientation of the virtual camera, but the main goal is to establish a one-to-one relationship between the user's head orientation and the orientation of the virtual cameras inside the VE. For example, when the user holds the hybrid display device while looking through its stereoscope (FIG. 4B), the tablet will always be oriented parallel with the user's face. So if the user is standing upright, and begins to bend at his/her hips to lean forward and look down, the orientation of the virtual cameras should also be updated to tilt downwards to present a downward view of the VE to the user's eyes. Similarly, as the user looks up in the real world, he/she looks up in the VE. In technical terms, the yaw, pitch, and roll of the device should be mapped directly to the yaw, pitch, roll of the virtual cameras.

Rendering

After the sensor data has been acquired and mapped, the 2D rasterization of the 3D VE takes place and images are drawn to views 26, 28, and optionally 42 (912). Alternatively, view 42 can display only solid color. Or it can display live video from the tablet's built-in camera(s).

Next, the graphical user interface (GUI) is drawn on top what was already rendered for view 42 (914). Depending on the application of the software, the GUI may consist of any combination of buttons 34, menus 30, sliders 40, dials 32, and zones 36. It may also display textual information, 2D images, and pre-recorded video.

Because view 24 (comprised of 26 & 28) and 42 can be programmed to display virtually anything, whatever it displays in general can be changed based on a combination of software states. For example, if the entire hybrid display is oriented flat on top of a table surface, view 42 can display a body of text similar to a book also laying flat on a table. Once the hybrid display is lifted off of the table and oriented towards the user's face, the software can switch back to an interactive GUI for view 42 and an immersive view for view 24.

Input

At this stage, user input can be gathered from the touchscreen of the tablet and be used to trigger different events in the software (916). Most tablet touchscreens can detect multiple finger-touches, so at a given moment in time, the software must loop through and identify all of the fingers that are touching the screen. For example, for a control to be manipulated, the software must check how many fingers are touching the control (918). Some controls may be manipulated with one finger (920). Other controls may be manipulated with two fingers (928).

A control can be manipulated in one dimension, such as slider 40 which is similar to a fader on a sound mixing console; or a radial dial 32 which is similar to the volume control of a car stereo. Alternatively, a control can be a circle-shaped joystick zone 36 on the screen which can be manipulated in two-dimensions.

Zone 36 can be used to control the virtual cameras position inside the VE (922). Its placement in view 42 is important because the control itself must be reachable by the user's thumb(s) when the hybrid viewer is held in the manner indicated by FIG. 4B. Because this control occupies the same coordinate system as the stereoscopic view 24 it is easy for the user to understand how the position of his/her thumb inside zone 36 relates to the position of the virtual cameras (924). For example, when the user moves his/her thumb "up" inside zone 36 (in the direction towards the top of the tablet) this can be programmed to move the virtual cameras vertically upwards inside the VE. Alternatively, the controller can be programmed to move the virtual cameras forward in the direction the user is facing when the thumb moves up inside zone 36.

Other controls, such as single-touch buttons 34, can be used to change modes of interaction, such as changing the appearance of text, images, videos; or flipping pages of a book; or playing, pausing, or seeking through video; or advancing through a slide show; or toggling sounds or music; or activating and toggling menus. These buttons do not have to be visible and can take the appearance of text hyperlinks on a document or web page.

Any kind of control can be used to change the VE or make changes inside the VE, such as switching environments, creating or activating effects, or changing the volume of audio. They can also activate static text and images that helpfully explain the function of each control. The location and appearance of touchscreen controls are arbitrary and can change or transform at any time to suit the needs of the user and their immersive experience.

If multiple fingers are touching the screen, the software can interpret it as a grasping gesture to manipulate an interact-able object 38 (928). The software can then recognize when the fingers move up, down, or side-to-side; in order to correspondingly move object 38 up, down, and side-to-side in the VE (930). The touchscreen then gives the user the feeling of being able to reach into the VE to interact with objects within it. If the update loop exits (926), the process may terminate (932).

Thus the reader will see that the hybrid stereoscopic display combines two modes of operation in a single device. When held up to the face, the user has an immersive virtual reality (VR) viewer in which they can view and interact with stereoscopic imagery and virtual worlds; when lowered to a desktop or lap, the user has a touchscreen interface that can be used to view and interact with 2D content. This is a new kind of media platform supporting both multi-touch screen-based interactions, and fully immersive VR, combining both modes into a single hybrid device. With this new platform we are creating a new class of media experiences that will make a huge impact in education and entertainment.

The list of possible experiences are endless. A few examples of these applications are:

Imagine reading a story about a magical forest and then being able to peer into the viewer to find yourself surrounded by those very same enchanted woods. Picture reading a story about a wizard then glancing through your viewer to discover the sage standing in your room.

A real estate app, with a navigable map of the house location and a floor plan displayed on the lower portion of the screen, along with immersive 360 degree 3D panoramas of the exterior, and of the interior rooms of the house.

A math textbook, with examples and problems presented on the lower part of the screen, along with 3D views of geometric figures and formulas on the upper part.

A history of the Civil War, with interactive maps and historical documents displayed on the lower part of the screen, along with historic 3D photographs on the upper part.

An interactive strategy game combined with a first-person shooter VR experience.

A molecular modeling app, with data and controls on the lower part of the screen and stereoscopic views of molecular models on the upper part.

An online catalog of real merchandise or digital content in the lower part of the screen coupled with a stereoscopic preview of the merchandise or digital content in the upper part.

A "fish tank"-style VR experience which gives the user a perspective-correct view of a virtual environment in the lower part based on the user's body relative to the surface of the screen, as detected by the tablet's front facing camera or other sensors.

Although the description above contains many specificities, these should not be construed as limiting the scope of the disclosure but as merely providing illustrations of some implementations. For example:

The stereoscope can attach to the tablet with elastic straps that go around the back of the tablet.

The stereoscope can be built into a carrying case which typically protects the surface of the tablet.

The stereoscope can be made of a flexible material allowing it to collapse into a compact form, and stretching out to normal operating dimensions.

The front surface of the stereoscope containing the lenses does not need to be flat, but can be curved or molded around the natural curvature of the human face.

The lenses can have other shapes, such as oval, rectangular, triangular, cylindrical, etc.

The saddle bridge can be cushioned with soft padding to create more comfort for the user's nose.

The stereoscope can have built-in flaps that cover the lenses to protect against scratches.

The stereoscope can contain hinging mechanisms to allow it to swing onto and away from the surface of the tablet like a screen door.

The stereoscope can be painted in any color.

The layout of the GUI is completely arbitrary and depends on the purpose of the VR application.

The layout of cutouts with beveled grooves in the stencil is completely arbitrary and depends on the layout of the GUI beneath it.

Figures 10A, 10B:
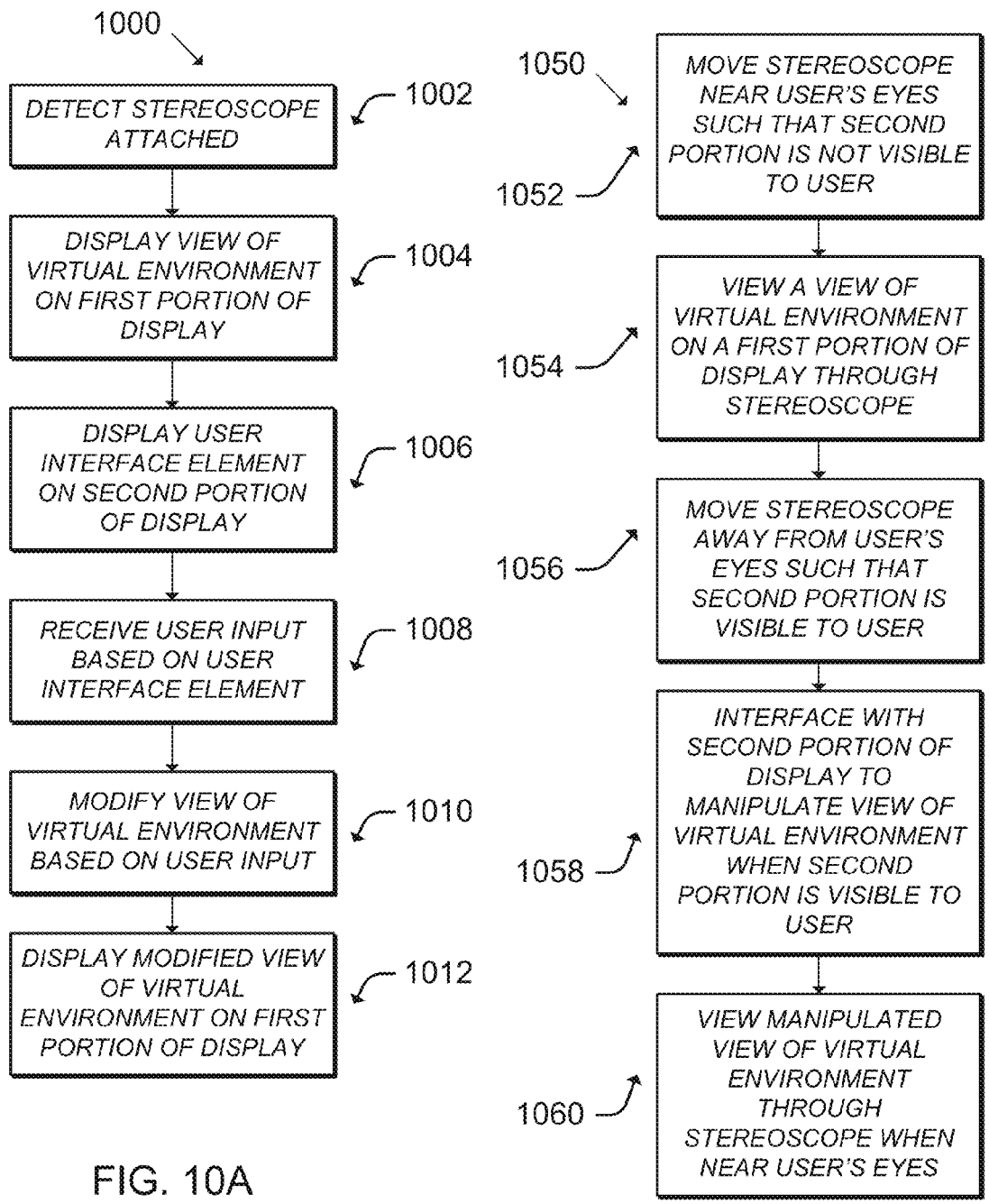
FIG. 10A illustrates a flowchart of according to example aspects of the present disclosure
FIG. 10B illustrates a flowchart of according to example aspects of the present disclosure.

FIG. 10A presents a flowchart 1000 of a process according to one implementation. At 1002, whether a stereoscope is attached is detected, as in FIG. 1 or 5C. At 1004, a view 24 of the virtual environment is displayed on a first portion 102 of the display 106. At 1006, a user interface element (32, 34, 40) is displayed on a second portion 104 of the display 106. At 1008, a user input based on the user interface element is received, as in FIG. 4A. At 1010, the view of the virtual environment is modified based on the user input. At 1012, the modified view of the virtual environment is displayed on the first portion of the display.

FIG. 10B presents a flowchart 1050 of a process according to one implementation. At 1052 the stereoscope 200 is moved near the user's 400 eyes such that the second portion 104 is not visible to the user, as in FIG. 4B. At 1054, the view 24 of the virtual environment is viewed on the first portion 102 of the display 106 through the stereoscope. At 1056 the stereoscope is moved away from the user's eyes such that the second portion is visible to the user. At 1058 the user may interface with the second portion of the display to manipulate the view of the virtual environment when the second portion is visible to the user. At 1060 the manipulated view of the virtual environment is viewed through the stereoscope when the stereoscope is near the user's eyes.

Figure 11:
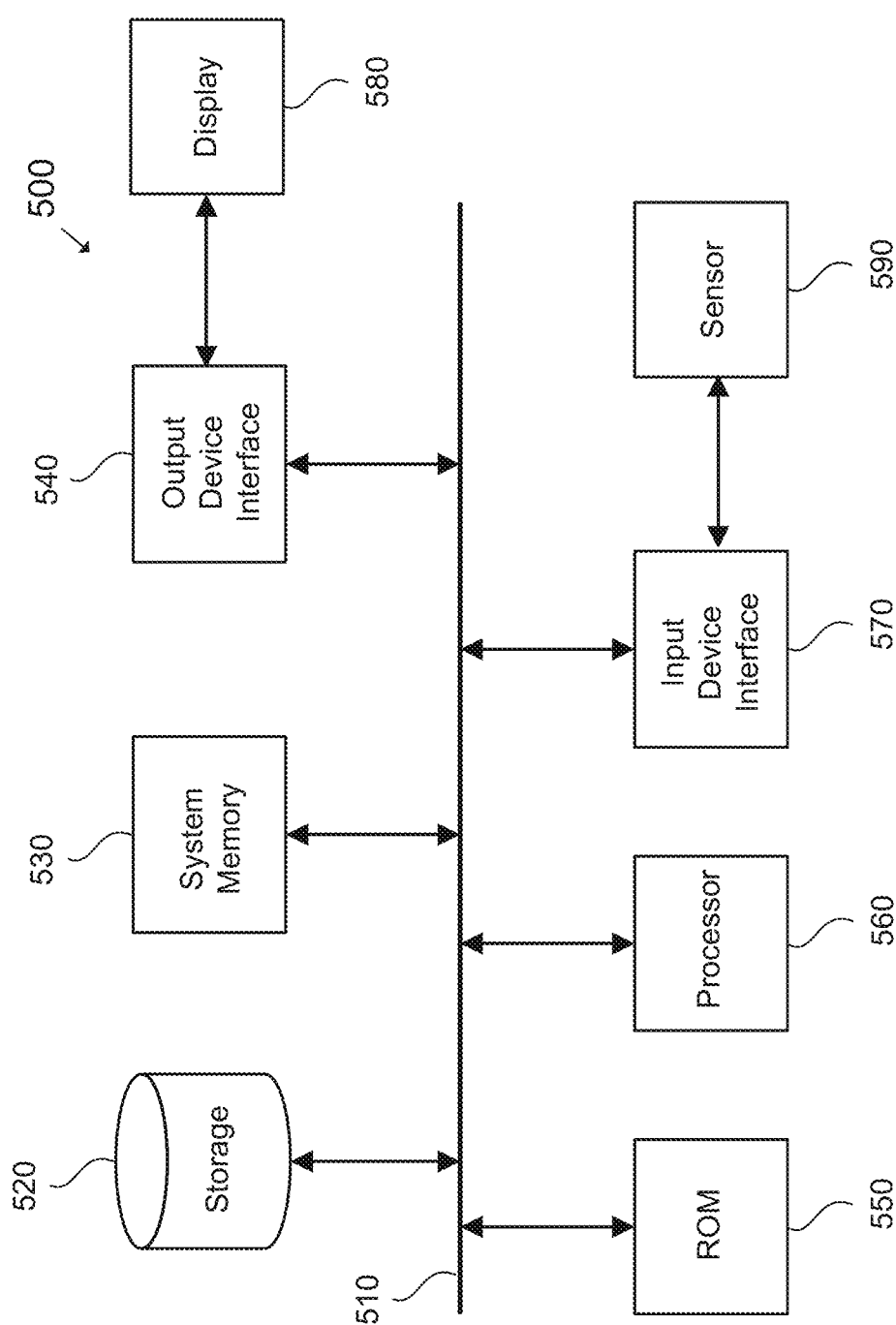
FIG. 11 illustrates a conceptual diagram of a computer system according to example aspects of the present disclosure.

FIG. 11 conceptually illustrates an example computer system or electronic system with which some implementations of the subject technology can be implemented. Electronic system 500 can be a computer, phone, PDA, tablet or any other sort of electronic device. The electronic system 500 may be integrated with a head mounted display or head-coupled display, may be partially integrated with the head mounted display, or may be external to and in communication with the head mounted display. Such an electronic system includes various types of computer readable media and interfaces for various other types of computer readable media. Electronic system 500 includes a bus 510, processing unit(s) 560, a system memory 530, a read-only memory (ROM) 550, a permanent storage device 520, an input device interface 570, an output device interface 540, a display 580, and a sensor 590.

The bus 510 collectively represents all system, peripheral, and chipset buses that communicatively connect the numerous internal devices of electronic system 500. For instance, the bus 510 communicatively connects the processing unit(s) 560 with the ROM 550, system memory 530, and permanent storage device 520. Portions of the bus 510 may be wireless.

From these various memory units, the processing unit(s) 560 retrieves instructions to execute and data to process in order to execute the processes of the present disclosure. The processing unit(s) 560 can be a single processor or a multi-core processor in different implementations.

The ROM 550 stores static data and instructions that are needed by the processing unit(s) 560 and other modules of the electronic system. The permanent storage device 520, on the other hand, is a read-and-write memory device. This device is a non-volatile memory unit that stores instructions and data even when electronic system 500 is off. Some implementations of the subject disclosure use a mass-storage device (for example, a magnetic or optical disk and its corresponding disk drive) as the permanent storage device 520.

Other implementations use a removable storage device (for example, a floppy disk, flash drive, and its corresponding disk drive) as the permanent storage device 520. Like the permanent storage device 520, the system memory 530 is a read-and-write memory device. However, unlike the storage device 520, the system memory 530 is a volatile read-and-write memory, such as a random access memory. The system memory 530 stores some of the instructions and data that the processing unit(s) 560 needs at runtime. In some implementations, the processes of the present disclosure are stored in the system memory 530, the permanent storage device 520, or the ROM 550. For example, the various memory units include instructions for receiving user activity data and updating dimensions in accordance with some implementations. From these various memory units, the processing unit(s) 560 retrieves instructions to execute and data to process in order to execute the processes of some implementations.

The bus 510 also connects to input device interface 570 and output device interface 540. The input device interface 570 enables the user to communicate information and select commands to the electronic system. Input devices used with input device interface 570 include, for example, alphanumeric keyboards and pointing devices (also called "cursor control devices"). The sensor 590, which may correspond to the sensor 115, may be one or more sensors configured to detect a user state, such as physiological and other parameters as described above, and may be further configured as trackers for a head mounted display. The output device interface 540 enables, for example, the display of images generated by the electronic system 500. Output devices used with the output device interface 540 include, for example, printers and display devices, for example, cathode ray tubes (CRT) or liquid crystal displays (LCD), which may be used as a display for the head mounted display. Some implementations include devices, for example, a touchscreen that functions as both input and output devices.

Finally, the bus 510 also couples the electronic system 500 to a wired or wireless network (not shown). In this manner, the computer can be a part of a network of computers (for example, a local area network (LAN), a wide area network (WAN), or an Intranet, or a network of networks, for example, the Internet. Any or all components of electronic system 500 can be used in conjunction with the present disclosure.

Unless otherwise indicated, the devices and processes that have been discussed herein are implemented with a computer system configured to perform the functions that have been described herein for the component. Each computer system includes one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various implementations to streamline the disclosure. This method of disclosure should not be interpreted as requiring claimed implementations to require more features than are expressly recited in each claim. Rather, as the following claims reflect, inventive subject matter lies in less than all features of a single disclosed implementation. Thus, the following claims are hereby incorporated into the detailed description, with each claim standing on its own as separately claimed subject matter.

The invention claimed is:

1. A method of interacting with a virtual environment using a stereoscope attached to a display of a computing device that also functions as an input device, the display having a first portion and a second portion, the stereoscope covering the first portion but not the second portion and positioned to allow stereoscopic viewing of a view of the virtual environment, the method comprising:
   displaying, on the first portion, a rendering of the virtual environment;
   displaying, on the second portion, a user interface element;
   receiving, from the input device, a user input based on the user interface element;
   modifying, based on the user input, the virtual environment or the view of the virtual environment; and
   displaying, on the first portion, a modified rendering of the virtual environment.

2. The method of claim 1, further comprising:
   displaying, on the second portion, a 2D rendering of the virtual environment.

3. The method of claim 2, wherein displaying the user interface element further comprises overlaying the user interface element over the 2D rendering of the virtual environment.

4. The method of claim 2, wherein the 2D rendering includes a virtual object in the virtual environment.

5. The method of claim 1, further comprising:
   producing a sound, from a speaker of the computing device, based on the modified rendering of the virtual environment.

6. The method of claim 1, further comprising:
   modifying, based on the modified rendering of the virtual environment, the user interface element; and
   displaying, on the second portion, the modified user interface element.

7. The method of claim 1, further comprising:
   receiving, from a sensor of the computing device, a sensor data; and
   modifying, based on the sensor data, the rendering of the virtual environment.

8. The method of claim 1, further comprising:
   receiving, from an accelerometer of the computing device, a GPS sensor of the computing device, or a gyrometer of the computing device, an acceleration data, a geospatial data, or an orientation data; and
   modifying, based on the acceleration data, the geospatial data, or the orientation data, the rendering of the virtual environment.

9. The method of claim 1, further comprising:
   receiving, from a camera of the computing device, a video data; and
   displaying, on the first portion, the video data and the rendering of the virtual environment.

10. The method of claim 1, further comprising:
    receiving, from a microphone of the computing device, a sound data;
    modifying, based on the sound data, the rendering of the virtual environment.

11. The method of claim 1, wherein the second portion comprises at least 50% of a viewable area of the display.

12. The method of claim 1 wherein:
    the stereoscope is held close to eyes during at least a portion of the first recited step of displaying a rendering;
    the stereoscope is held away from the eyes during at least a portion the third recited step of receiving user input; and
    the stereoscope is again held close to the eyes during at least a portion of the fifth recited step of displaying a modified rendering.

* * * * *